(12) United States Patent
Mencher et al.

(10) Patent No.: US 8,844,395 B2
(45) Date of Patent: Sep. 30, 2014

(54) TORQUE TRANSMISSION ASSEMBLY, PARTICULARLY FOR THE DRIVETRAIN OF A VEHICLE

(75) Inventors: Georg Mencher, Grafenrheinfeld (DE); Thomas Walter, Kolitzheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 754 days.

(21) Appl. No.: 13/042,566

(22) Filed: Mar. 8, 2011

(65) Prior Publication Data

US 2011/0219894 A1   Sep. 15, 2011

(30) Foreign Application Priority Data

Mar. 15, 2010 (DE) .......................... 10 2010 002 846

(51) Int. Cl.
*F16H 57/00* (2012.01)
*F16H 41/24* (2006.01)
*F16D 1/10* (2006.01)

(52) U.S. Cl.
CPC ............... *F16D 1/101* (2013.01); *F16H 41/24* (2013.01); *F16D 2001/103* (2013.01)
USPC ........................................ 74/411; 192/69.83

(58) Field of Classification Search
USPC ............... 74/335, 337, 607, 819; 192/213.12, 192/231.22; 403/259, 261, 370, 94, 902
See application file for complete search history.

(56) References Cited

U.S. PATENT DOCUMENTS

| | | | | |
|---|---|---|---|---|
| 2,348,717 A | * | 5/1944 | Banker | 192/69.83 |
| 3,331,258 A | * | 7/1967 | Eckerle et al. | 74/460 |
| 3,350,954 A | * | 11/1967 | Ruettinger | 74/333 |
| 4,416,650 A | * | 11/1983 | Wilkins | 474/161 |
| 5,769,196 A | * | 6/1998 | Murata | 192/3.29 |
| 6,968,144 B2 | * | 11/2005 | Mizoguchi | 399/167 |
| 7,984,800 B2 | * | 7/2011 | Frey et al. | 192/3.3 |
| 8,042,666 B2 | * | 10/2011 | Frey et al. | 192/3.3 |
| 2008/0156129 A1 | * | 7/2008 | Degler | 74/411 |
| 2008/0236974 A1 | * | 10/2008 | Frey et al. | 192/3.29 |

* cited by examiner

*Primary Examiner* — David M Fenstermacher
*Assistant Examiner* — Zakaria Elahmadi
(74) *Attorney, Agent, or Firm* — Cozen O'Connor

(57) ABSTRACT

A torque transmission assembly includes two structural component parts for coupled engagement to one another so as to rotate together around an axis of rotation, a first of these structural component parts has an inner circumferential toothing and a second of these structural component parts has an outer circumferential toothing for a rotary coupling engagement with the inner circumferential toothing. The teeth in one toothing of an inner circumferential toothing and outer circumferential toothing are bounded by end faces in a first axial end area of the one toothing. The one toothing has at least one tooth with an end face which is extended forward axially relative to the end faces of the other teeth of the one toothing, and the end face of at least one tooth of the one toothing with the end face which is extended forward axially forms a circumferentially deflecting end face for the other toothing.

11 Claims, 4 Drawing Sheets

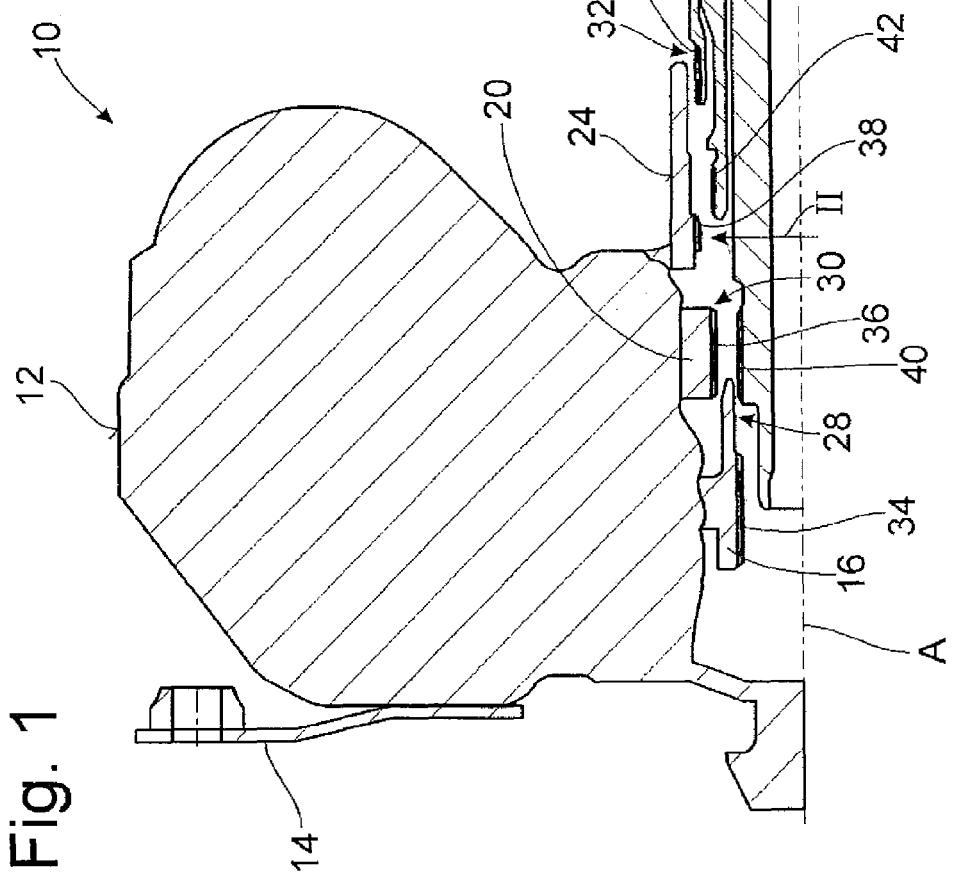
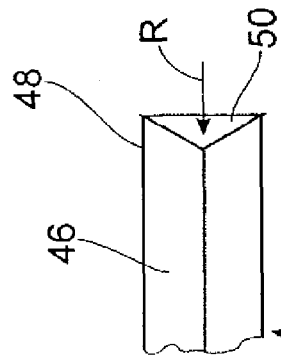

Fig. 4
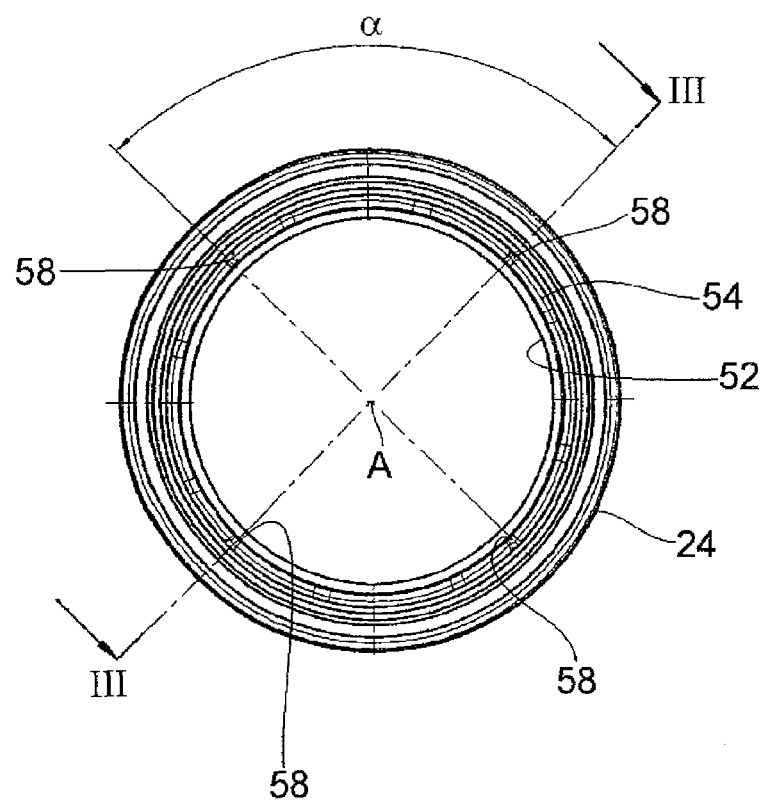
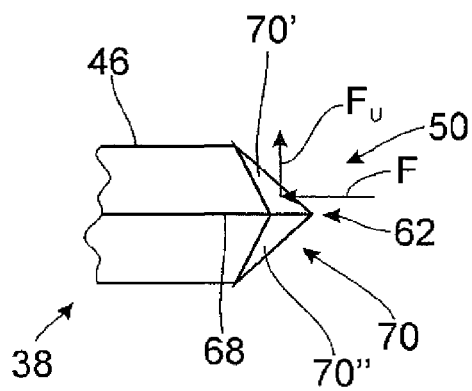
Fig. 6
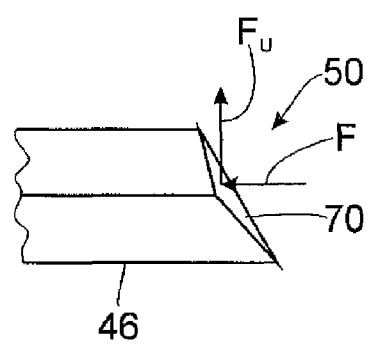
Fig. 7

US 8,844,395 B2

TORQUE TRANSMISSION ASSEMBLY, PARTICULARLY FOR THE DRIVETRAIN OF A VEHICLE

BACKGROUND OF THE INVENTION

1. Field of the Invention

The present invention is directed to a torque transmission assembly, particularly for the drivetrain of a vehicle, comprising two structural component parts which are coupled to one another, or are to be coupled to one another, so as to rotate jointly around an axis of rotation, wherein a first of these structural component parts has an inner circumferential toothing and a second of these structural component parts has an outer circumferential toothing which is in, or is to be brought into, a rotary coupling engagement with the inner circumferential toothing, wherein the teeth in one toothing of an inner circumferential toothing and outer circumferential toothing are bounded by end faces in a first axial end area of the one toothing, in which first axial end area the teeth of the one toothing first enter into rotary coupling engagement with the teeth of the other toothing.

2. Description of the Related Art

In the drivetrain of a vehicle, structural component parts or drivetrain components which are supplied separately prior to assembly of the drivetrain must be coupled with one another at various locations when assembling the drivetrain in order to ensure a flow of torque along the drivetrain or to provide an auxiliary power take-off or a torque support in the drivetrain. This is illustrated in the following with reference to FIG. 1 showing a schematic view of a hydrodynamic torque converter 10. The hydrodynamic torque converter comprises a housing 12 which is to be coupled to a drive unit, e.g., of an internal combustion engine, by a coupling arrangement 14 and can be driven in rotation around an axis of rotation A by means of the coupling arrangement. Generally, an impeller, a turbine and a stator are arranged in the interior of a hydrodynamic torque converter of this kind. The driving torque for a vehicle is transmitted to a transmission input shaft 18 by a turbine hub 16, for example. The stator is supported by a stator hub 20 on a supporting shaft 22 so that it is rotatable in one direction around the axis of rotation A but prevented from rotating in the other direction by the action of a freewheel provided at the stator hub 20. An impeller hub 24 which is furnished by the housing 12 or provided at the latter drives a fluid pump, i.e., an oil pump, for example, which is arranged, e.g., in a gear unit, in rotational operation by a pump shaft 26 and is constructed as a hollow shaft, as is the supporting shaft 22.

Torque transmission assemblies 28, 30, 32, each of which comprises a toothing 34, 36, 38 at one of the structural component parts to be coupled and a toothing 40, 42, 44 at the other one of the structural component parts to be coupled, serve as a torque transmission coupling or torque support coupling between these different parts of the system.

When building a drivetrain in a hydrodynamic torque converter, the hydrodynamic torque converter 10 is installed in direction of the axis of rotation A on the three shafts 18, 22, 26 which are arranged coaxial to one another. It will be seen from FIG. 1 that in so doing it is generally impossible to discern visually whether or not the teeth of the respective toothings which are to be brought into rotary coupling engagement with one another are aligned with respect to one another in such a way that they can mesh with one another axially. In the hydrodynamic torque converter 10, assembly is basically carried out in such a way that when this hydrodynamic torque converter 10 is moved axially toward the three coaxially disposed shafts 18, 22, 26, the toothings 34, 40 of the torque transmission assembly 28 are brought into the state of rotary coupling engagement first and then, in a further axial movement, the toothings 36 and 38 of torque transmission assembly 30 and, finally, the toothings 38, 44 of torque transmission assembly 32 are brought into rotary coupling engagement.

A blocking of axial movement due to collision between toothings 34, 40 and toothings 36, 42 may be remedied by a slight rotation of the torque converter 10. As can be seen from FIG. 2, this blocking of axial movement has to do with the fact that, e.g., the teeth 46 of toothing 34 at the turbine hub are bounded in their axial end area 48, in which they first enter into engagement with the teeth of toothing 40 at the transmission input shaft 18 when producing the rotary coupling engagement, by an end face 50 which basically extends substantially orthogonal to the direction of the axis of rotation and, therefore, also orthogonal to a movement direction R in which the toothings 34, 40 are to be moved toward one another. These end faces 50 are generally slanted in axial direction as can be seen from FIG. 2. This orientation which is basically perpendicular to the movement direction R and to the axis of rotation A prevents further axial movement when the teeth of the toothings 34, 40 collide with one another. The active rotation of the toothings until the end faces of two teeth or toothings no longer collide with one another permits a further axial movement. However, the toothings 38, 44 may be in a situation such that a rotation of the hydrodynamic torque converter 10 in its entirety generally causes the pump driveshaft 26 to rotate along with it as the latter rotates very easily.

Due to the fact that when attempting to rotate the torque converter 10, the pump driveshaft 26 rotates along with it because the toothings collide axially with one another, the rotary coupling engagement of the two toothings 38, 44 can generally only be accomplished by first pulling back the torque converter 10, rotating it slightly without contacting the pump driveshaft 26, and then moving it axially toward the pump driveshaft 26 again. However, it cannot be ascertained visually whether or not the toothings 38, 44 are properly oriented so as to allow the rotary coupling engagement to be produced.

SUMMARY OF THE INVENTION

It is an object of the present invention to provide a torque transmission assembly, particularly for the drivetrain of a vehicle, with which the rotary coupling engagement of two system parts which are to be coupled so as to rotate jointly can be produced in a simple and reliable manner.

This object is met according to the invention by a torque transmission assembly, particularly for the drivetrain of a vehicle, comprising two structural component parts which are coupled to one another, or are to be coupled to one another, so as to rotate jointly around an axis of rotation, wherein a first of these structural component parts has an inner circumferential toothing and a second of these structural component parts has an outer circumferential toothing which is in, or is to be brought into, a rotary coupling engagement with the inner circumferential toothing, wherein the teeth in one toothing of an inner circumferential toothing and outer circumferential toothing are bounded by end faces in a first axial end area of the one toothing, in which first axial end area the teeth of the one toothing first enter into rotary coupling engagement with the teeth of the other toothing.

For this purpose, it is further provided that the one toothing has at least one tooth with an end face which is extended forward axially relative to the end faces of the other teeth of the one toothing, and that the end face of the at least one tooth of the one toothing with the end face which is extended forward axially forms a circumferentially deflecting end face for deflecting the other toothing.

In the construction of a torque transmission assembly according to the invention, two design aspects are advantageously combined. When the two structural component parts to be coupled are moved toward one another axially, the forwardly extended positioning of the end face of at least one tooth of a toothing ensures in a compulsory manner that this tooth with the forwardly extended end face first collides axially at the toothing of the other structural component part insofar as the two toothings are not oriented so as to permit them to mesh with each other axially. However, since the end face of this tooth is constructed as a circumferentially deflecting end face, it produces an effect under axial load whereby the axially loading assembly is deflected in circumferential direction, which results in a relative rotation of the structural component parts having the two toothings instead of the blocking of axial movement described above with reference to the prior art. This relative rotation produces a compulsory orientation of the toothings such that these toothings engage axially one inside the other so that the rotary coupling engagement can be achieved. Once the relative rotation is brought about in a compulsory manner and the axial movement proceeds, the other teeth of the two toothings also enter into the tooth spaces between the teeth of the other toothing so as to produce the rotary coupling engagement.

It can be provided, for example, that the end face of the at least one tooth of the one toothing with the forwardly extended end face is slanted in circumferential direction, at least in some areas, with respect to a relative movement direction of the toothings when producing the rotary coupling engagement.

In order to reduce the loading of the toothings in a more uniformly distributed manner along the circumference when producing the rotary coupling engagement, it is proposed that the one toothing comprises a plurality of teeth with a forwardly extended circumferentially deflecting end face which are distributed in circumferential direction. In an embodiment that can be realized in a particularly simple manner with respect to construction, it is proposed that the one toothing comprises teeth with circumferentially deflecting end faces which are arranged at different axial positions.

In order to provide at least one tooth of the one toothing with a circumferentially deflecting end face in a simple manner, for example, by broaching, it is proposed that the axial positions of the end faces of the teeth of the one toothing repeat in a substantially regular pattern in circumferential direction. In this way, in particular, the end faces of the teeth of the one toothing are provided along a curved path proceeding from a circumferentially deflecting end face which extends forward to the maximum extent. This means that in a respective toothing the positioning of the circumferentially deflecting end faces is altered substantially continuously regardless of the discrete sequence of teeth in circumferential direction.

The one toothing can have a plurality of teeth with a circumferentially deflecting end face that extends forward to a maximum extent. In an arrangement of this kind, the teeth with a circumferentially deflecting end face which extends forward to a maximum extent are preferably arranged so as to be uniformly circumferentially spaced relative to one another.

The uniform circumferential spacing of the circumferentially deflecting end faces is particularly advantageous when the one toothing has an odd number of teeth. As a result, especially when the end faces of the different teeth are arranged along a curve with respect to their axial positioning, the circumferentially deflecting end faces are formed at different teeth having end faces which extent forward to a maximum extent, also with different geometries, and can therefore produce different deflecting effects. This makes it easier to compel a relative rotation of the two toothings under axial loading.

To further enhance the effect of the circumferentially deflecting end faces of the teeth of the one toothing, it is proposed that the teeth of the other toothing are bounded by end faces in a first axial end area of the other toothing, in which first axial end area the teeth of the other toothing first enter into a rotary coupling engagement with the teeth of the one toothing, and that the end faces of the teeth of the other toothing are arranged at substantially the same axial position. In this way, it is ensured that the circumferentially deflecting action is effective substantially always at the same relative axial positioning regardless of the relative rotational position of the two toothings with respect to one another.

This circumferentially deflecting action can be further enhanced in that at least some of, preferably all of, the end faces of the teeth of the other toothing form circumferentially deflecting end faces for the one toothing.

For purposes of facilitating production, it is advantageous when the one toothing is the inner circumferential toothing and the other toothing is the outer circumferential toothing.

In order to make efficient use of the inventive effect in a drivetrain of a vehicle, it is proposed that the first structural component part is a driven hub, preferably of a hydrodynamic torque converter, a hydrodynamic clutch or a friction clutch arrangement, and that the second structural component part is a shaft, preferably a pump driveshaft for a pressure fluid pump or supporting shaft.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention will be described in more detail in the following with reference to the accompanying drawings, in which:

FIG. 1 is a schematic diagram of a hydrodynamic torque converter with the three shafts to be coupled;

FIG. 2 is a plan view of a tooth of a toothing in viewing direction II of FIG. 1;

FIG. 4 is an axial view of the pump drive hub of FIG. 3 in viewing direction IV of FIG. 3;

FIG. 6 is a view corresponding to FIG. 2 showing a tooth with a circumferentially deflecting end face from the radially inner side;

FIG. 7 is a view corresponding to FIG. 6 showing an alternative construction of a tooth.

DETAILED DESCRIPTION OF THE PRESENTLY PREFERRED EMBODIMENTS

Figure 3:
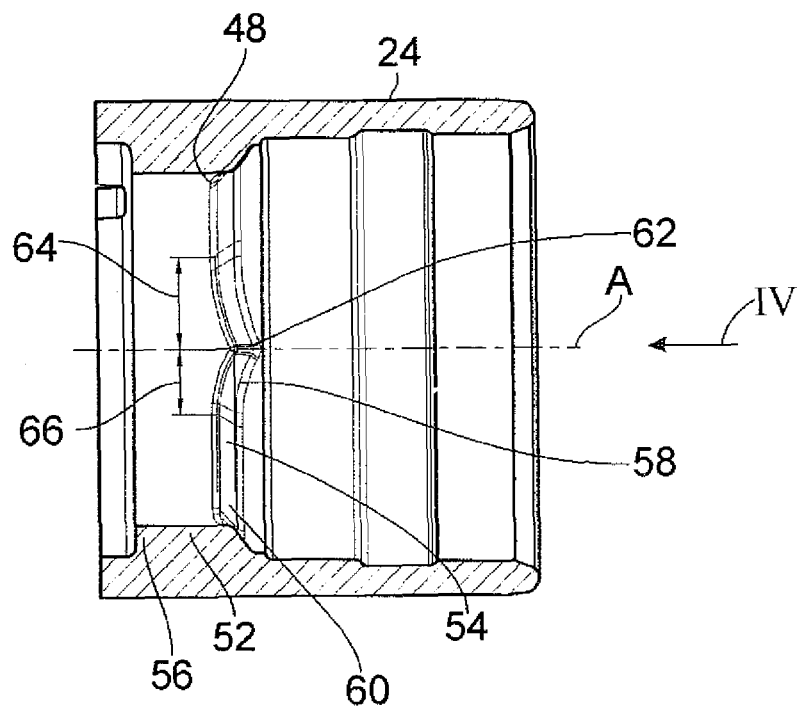
FIG. 3 is a longitudinal sectional view through a pump drive hub of a hydrodynamic torque converter in an intermediate stage of production.

Referring to FIGS. 3 to 8, the inventive construction of a torque transmission assembly 32 with toothings 38 at the pump drive hub 24 and toothing 44 at the pump drive shaft 26, will be described in more detail in the following based on the pump drive hub 24 of the housing 12 of a hydrodynamic torque converter 10 as is shown schematically in FIG. 1. It should be noted at this point that a construction of a torque transmission assembly such as that described in the following can, of course, also be realized alternatively or in addition in the other two torque transmission assemblies 28 and 30 shown in FIG. 1 or in other areas of, or constructional types of, a drivetrain, for example, in the coupling of the output area of a wet friction clutch, possibly also in a hybrid drive system, to a pump drive shaft or the like.

FIGS. 3 and 4 show the pump drive hub 24 in an intermediate stage of production. The drawings show an area 52 which projects radially inward and is initially annular. As will be seen from a comparison with FIG. 5, in the finished pump drive hub 24 this area 52 provides the toothing 38 which is formed as an inner circumferential toothing.

The annular area 52 is shaped in such a way that it has an end face 54 in the axial end area 48 of the toothing 38 to be produced. This end face 54 is slanted in axial direction similar to the end face 52 of the tooth 46 of the toothing 38 shown in FIG. 2. As a result of this axial configuration or slanting of the end face 54, there is a slanting step-shaped transition at the axial end area 48 to the surface level of the pump drive hub 24, which surface level is then located farther outward radially in contrast to the substantially right-angled step-like transition at the other axial end area 56 of the annular area 52 and accordingly also of the toothing 38 to be formed at the latter.

FIGS. 3 and 4 further show that the end face 54 and, therefore, the annular area 52 has undulating axial bulges 58 at a plurality of circumferential areas, namely, at four circumferential areas as in the present example.

Proceeding from a base axial level of the end face 54, which base axial level is provided at intermediate areas 60 of the annular area 52 and, therefore, also of the end face 54 which are formed between these bulges 58, the axial bulges 58 in bulge peak areas 62 form areas of the end face 54 which are shifted forward to the maximum degree with respect to the base axial level 60. The transition from the base axial level of the end face 54 provided in the intermediate circumferential area 60 to the bulge peak area 62 can be realized in two transitional areas 64, 66 leading to an axial curvature of the end face 54 on both sides of the bulge peak area 62 in circumferential direction. These circumferential areas 64, 66 can be formed so as to extend equally far in circumferential direction, but can also have disparate shapes as is illustrated in FIG. 3. For example, the transitional area 64 can cover a circumferential distance of about 9 to 12 mm, while transitional area 66 can cover a circumferential distance of about 6 to 8 mm.

FIG. 4 also shows that the bulge peak areas 62 are arranged at an angular distance a relative to one another; this angular distance a is identical for all of the successive bulge peak areas 62 and, accordingly, amounts to 90° when four such bulge peak areas are formed.

The blank for the pump drive hub 24 shown in FIGS. 3 and 4 can be provided with the geometry shown in these drawings, e.g., by casting processes, sintering processes, or cold-forming pressing processes. In a subsequent finishing process, the inner circumferential toothing 38 in the annular area 52 is preferably produced by broaching using the appropriate tools. In this finishing process for producing the inner circumferential toothing 38, the teeth 46 of the toothing are formed with their respective end faces located in the two axial end areas 48, 56. While the end faces of the teeth 46 being formed in the axial end area 56 are substantially orthogonal to the axis of rotation A owing to the right-angled step-like transition, the end faces 50 at the axial end area 48 are slanted in axial direction and toward the radially inner side owing to the slanting or slanted step-like transition in the area of the end face 54 provided at the annular area 52 similarly as indicated with reference to FIG. 2.

In the circumferential areas of the toothing 38 formed in the locations of the intermediate areas 60 of the annular area 52 or of end face 54 which are formed substantially without axial curvature, the end faces 50 at the axial end area 48 are substantially oriented as indicated in FIG. 2. The end faces 50 are slanted not only in axial direction, but also in circumferential direction where the end face 54 provided at the blank is curved in axial direction, i.e., in the curved transitional areas 64, 66 leading to the respective bulge peak area 62. This will be described in the following referring to FIGS. 6 and 7.

FIG. 6 shows a plan view of a tooth 46 of the inner circumferential toothing 38 at the pump drive hub 23 viewed from the radially inner side. The circumferential center area of this tooth 46 defined by the apex 68 in FIG. 6 lies exactly at the location of the bulge peak area 62. When producing the toothing 38, the axial configuration of the end face 54 results in an end face 50 acting as a circumferentially deflecting end face 70. Due to the centering with respect to a bulge peak area 62, the circumferentially deflecting end face 70 is formed with two surface regions 70' and 70" which slant in opposite directions with respect to one another in circumferential direction. Owing to the axial slant and the slanting in circumferential direction, a force acting on the surface region 70' in the direction indicated by arrow F generates a circumferential force component $F_U$. This circumferential force component $F_U$ generates a circumferentially deflecting action between the teeth which are brought into contact with each other in this way, resulting in a relative rotation of the structural component parts carrying these teeth. This relative rotation persists under continuing axial loading until a tooth of toothing 44 at the pump drive shaft 26, which tooth is supported at the surface region 70', has been moved sufficiently far in circumferential direction to allow it to move in axial direction without further hindrance axially with respect to the tooth 46 shown in FIG. 6, and the rotary coupling engagement can accordingly be produced between the toothings 38 and 44.

FIG. 7 shows a tooth 46 which is not formed where a bulge peak area 62 is located in the blank, but rather in one of the transitional areas 64 or 66. The axial extension or curvature of the end face 54 of the annular area 52 provided in that area results in an end face 50 which acts as a circumferentially deflecting end face 70 and which is only carried out in one circumferential direction and generates a deflecting force component $F_U$ acting in circumferential direction when a force F is applied to it in an appropriate manner.

Fabrication of a pump drive hub 24 of this kind need not necessarily be carried out in such a way that the blank shown in FIG. 3 is exactly aligned in such a way with respect to a broaching tool for the toothing 38 to be produced that the apex 68 of a tooth to be produced also extends in a correspondingly centered manner in the location of one of the bulge peak areas 62. Rather, the blank can be inserted into a broaching tool without definite circumferential positioning presets for the bulge peak areas 62 with respect to the broaching tool, and the toothing 38 can then be formed in a broaching process. In so doing, teeth with end faces 50 and circumferentially deflecting end faces 70 having different geometries due to the pitch of the bulge peak areas 62 on one hand and the pitch of the teeth 46 of toothing 38 on the other hand can also be formed particularly in the area of the bulge peak areas. A tooth such as that shown in FIG. 6 in which the two surface regions 70' and 70" of the circumferentially deflecting end face 70 are constructed substantially symmetrical to one another owing to the centered position of the apex 68 need not necessarily be provided in order to achieve the effect according to the present invention.

When producing the toothing 38, the bulging construction of the end face 54 described above with reference to FIG. 3 with a plurality of bulge peak areas 62 which are preferably uniformly spaced around the circumference results in a structure in which teeth 46' are located where bulge peak areas 62 were provided in the blank, the end faces 50 or circumferentially deflecting end faces 70 of which teeth 46' are extended forward with respect to those end faces 50 formed in the intermediate areas 60 to a maximum extent in the axial direction R in which toothing 38 is to be moved toward toothing 44 when producing the rotary coupling engagement. The axial distance between these circumferentially deflecting end faces 70, which are extended forward to a maximum extent, and the end faces 50 which are set back the farthest axially in relation to these circumferentially deflecting end faces 70 and which cannot have a deflecting function, for example, can range from 1 to 4 mm. Therefore, in connection with the magnitude of the circumferential extension of the curved transitional areas 64, 66 or bulges 58, it can be ensured that the teeth with forwardly extended end faces 50, particularly the teeth 46' with end faces 50 extended forward to the greatest extent, will be slanted in circumferential direction such that a sufficiently large circumferential force component for compelling a relative rotation will be generated under axial load.

It is clear particularly from FIGS. 5 to 8 that by providing the bulges 58 and the undulating pattern of axial positions of end faces 50, which is substantially periodically repeated in circumferential direction, not only in the locations where the teeth 46' are formed in the area of the bulge peak areas 62 but also adjoining the latter in circumferential direction, end faces 50 which extend somewhat less far forward are formed at teeth which are likewise slanted in circumferential direction and, to this extent, also form circumferentially deflecting end faces. It should likewise be noted that when the two toothings to be coupled are moved toward one another axially, then initially or primarily or exclusively a circumferentially deflecting action is generated by the first teeth 46' in the axial end area 48 of toothing 38 coming into contact with the teeth of toothing 44.

In order to further reinforce this effect, it can further be provided that, in their axial end area which first engages with the teeth 46 of toothing 38 when producing the rotary coupling engagement, all of the teeth of the toothing 44 which is to be coupled with toothing 38 terminate at approximately the same level as the teeth 46 of toothing 38 in end area 56. In this way it is ensured that the teeth formed with circumferentially deflecting end faces 70 which are extended forward to a maximum degree first come into contact with the other toothing 44 and achieve the circumferentially deflecting effect. Further, it can be provided that the teeth of toothing 44, preferably all of the teeth of this toothing 44, are also formed with slanted circumferentially deflecting end faces, preferably in the manner shown in FIG. 6 in which each slanted circumferentially deflecting surface has two surface regions slanting in opposite directions. Since the toothing 44 to be coupled with the inner circumferential toothing 38 is an outer circumferential toothing, such teeth coming to a point in axial direction can be produced in a comparatively simple manner, for example, by means of a bell-type chamfering cutter.

Figure 5:
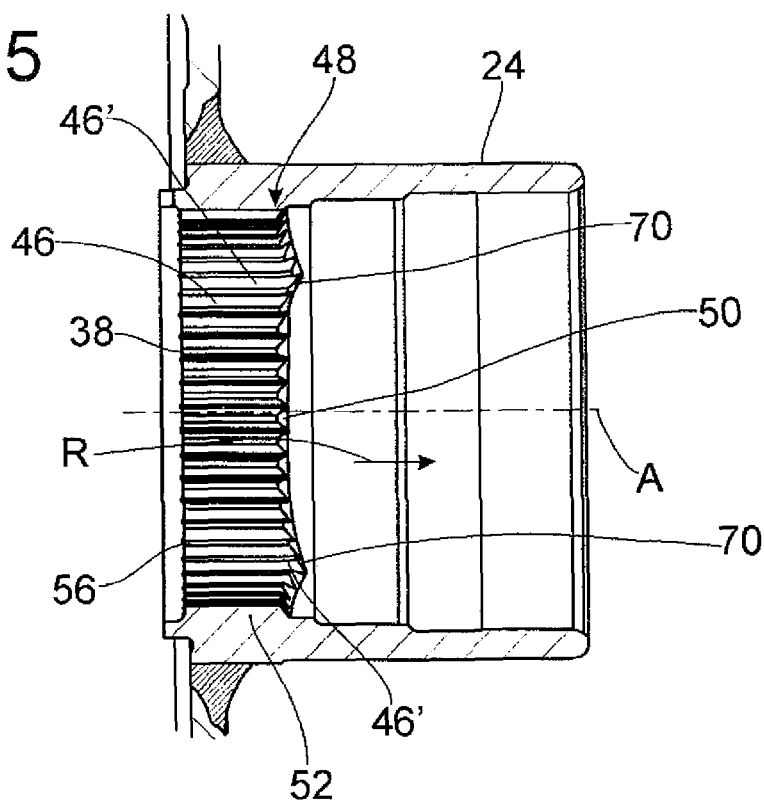
FIG. 5 is a longitudinal sectional view through the finished pump drive hub.
Figure 8:
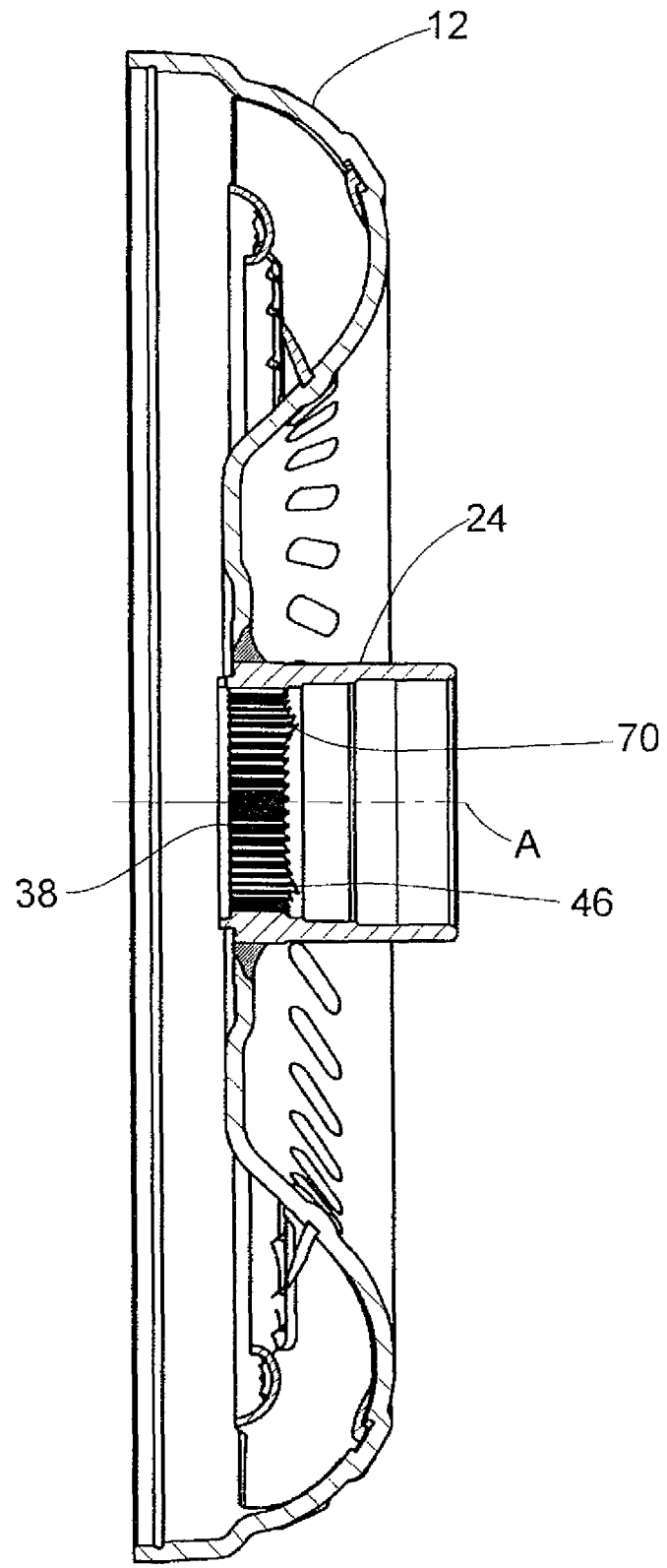
FIG. 8 is a cross-sectional view of a housing shell of a hydrodynamic torque converter with a pump drive hub constructed according to the present invention.

It should be mentioned in conclusion that the invention can also be constructed in a manner other than that described above. For example, only one individual tooth of the correspondingly shaped toothing could have an end face that is axially extended in front in relation to all of the other teeth, in which case the transitional areas resulting in the undulating structures shown in FIGS. 3 to 5 are not provided, or the circumferentially extending length of these transitional areas is dimensioned in such a way that it corresponds to the width of an individual tooth which is then to be formed at that location. Of course, a plurality of such teeth can also be arranged in circumferential direction, e.g., so as to be distributed at a uniform distance with respect to one another. Of course, the teeth with end faces which extend forward to a maximum degree may be arranged so as not to be equidistant in circumferential direction, i.e., for example, to design the bulge peak areas 62 correspondingly in the blank area so as not to be evenly spaced along the circumference. Accordingly, particularly when an even number of teeth is to be provided in the toothing designed in this way, a structure with differently shaped teeth with a circumferentially deflecting end face which is extended forward to a maximum degree is obtained as shown in FIGS. 6 and 7.

It should also be stressed once again that a torque transmission assembly of this kind can, of course, be realized in other system areas, e.g., of a drivetrain system, which are to be coupled to one another, in this case preferably permanently, by moving them toward one another axially to establish the driving condition.

The invention is not limited by the embodiments described above which are presented as examples only but can be modified in various ways within the scope of protection defined by the appended patent claims.

We claim:

1. A torque transmission assembly, comprising first and second structural component parts for coupled engagement to one another for common rotation about an axis of rotation, said first structural component part having a first circumferential toothing and said second structural component part having a second circumferential toothing configured for coupled engagement of said first and second toothing, each of said first and second toothing comprising an axial end area and a plurality of teeth each having an axial end face, wherein the end face of at least one tooth of said first toothing extends axially beyond the end faces of others of said plural teeth of said first toothing, and wherein said end face of said at least one tooth of said first toothing is configured to circumferentially relatively deflect an opposing tooth of the plural teeth of the second toothing so that when the first and second structural component parts are moved relatively together to couplingly engage said first and second toothings and the end face of said at least one tooth of said first toothing is relatively moved into opposition with the end face of said opposing tooth of said second toothing, the configured end face of said at least one tooth of said first toothing deflects the end face of said opposing tooth of said second toothing to effect relative rotation of said first and second toothings and of said first and second structural component parts into coupled engagement of said first and second toothings and of said first and second structural component parts;

wherein said first toothing comprises a plurality of said at least one tooth circumferentially distributed about said first toothing;

wherein said first structural component part is a driven hub, and said second structural component part is a shaft;

wherein said driven hub is the hub of one of a hydrodynamic clutch and a friction clutch arrangement; and
wherein said shaft is the shaft of one of a pump shaft for a pressure fluid pump and a supporting shaft; and
wherein the axial positions of said end faces of said plural teeth of said plurality of at least one tooth of said first toothing repeat in a substantially regular pattern circumferentially about said first toothing.

2. The torque transmission assembly according to claim 1, wherein said axially extending end face of said at least one tooth of said first toothing is circumferentially slanted in at least one area with respect to a relative movement direction (R) of said first and second toothings when producing said deflected relative rotary coupling engagement.

3. The torque transmission assembly according to claim 1, wherein said teeth of said plurality of at least one tooth of said first toothing have said circumferentially deflecting end faces arranged at different axial positions.

4. The torque transmission assembly according to claim 3, wherein the axial extensions of said end faces of the plural teeth of said plurality of at least one tooth of said first toothing are circumferentially arranged about said first toothing to define an axially curved path that extends between a minimum and a maximum axial extension.

5. The torque transmission assembly according to claim 1, wherein the end face of each of the plural teeth of said plurality of at least one tooth of said first toothing extends radially to a same maximum extension.

6. The torque transmission assembly according to claim 5, wherein the plural teeth of said plurality of at least one tooth of said first toothing are arranged so as to be uniformly circumferentially spaced about the first toothing.

7. The torque transmission assembly according to claim 1, wherein said first toothing comprises an odd number of said teeth.

8. The torque transmission assembly according to claim 1, wherein one of said first and second toothings is circumferentially disposed radially inward of the other of said first and second toothings.

9. The torque transmission assembly according to claim 1, wherein the end face of at least one tooth of said second toothing extends axially beyond the end faces of others of said plural teeth of said second toothing, and wherein said end face of said at least one tooth of said second toothing is configured to circumferentially relatively deflect an opposing tooth of the plural teeth of the second toothing to facilitate said relative rotation of said first and structural component parts effected as the first and second structural component parts are moved relatively together into coupled engagement.

10. The torque transmission assembly according to claim 8, wherein said first toothing is disposed on said first structural component part so as to be radially inward of said second toothing of the second structural component part when said first and second toothings are couplingly engaged.

11. A torque transmission assembly, comprising first and second structural component parts for coupled engagement to one another for common rotation about an axis of rotation, said first structural component part having a first circumferential toothing and said second structural component part having a second circumferential toothing configured for coupled engagement of said first and second toothing, each of said first and second toothing comprising an axial end area and a plurality of teeth each having an axial end face, wherein the end face of at least one tooth of said first toothing extends axially beyond the end faces of others of said plural teeth of said first toothing, and wherein said end face of said at least one tooth of said first toothing is configured to circumferentially relatively deflect an opposing tooth of the plural teeth of the second toothing so that when the first and second structural component parts are moved relatively together to couplingly engage said first and second toothings and the end face of said at least one tooth of said first toothing is relatively moved into opposition with the end face of said opposing tooth of said second toothing, the configured end face of said at least one tooth of said first toothing deflects the end face of said opposing tooth of said second toothing to effect relative rotation of said first and second toothings and of said first and second structural component parts into coupled engagement of said first and second toothings and of said first and second structural component parts;

wherein said first toothing comprises a plurality of said at least one tooth circumferentially distributed about said first toothing;

wherein said first structural component part is a driven hub, and said second structural component part is a shaft;

wherein said driven hub is the hub of one of a hydrodynamic clutch and a friction clutch arrangement; and wherein said shaft is the shaft of one of a pump shaft for a pressure fluid pump and a supporting shaft;

wherein the axial positions of said end faces of said plural teeth of said plurality of at least one tooth of said first toothing repeat in a substantially regular pattern circumferentially about said first toothing;

wherein the end face of each of the plural teeth of said plurality of at least one tooth of said first toothing extends radially to a same maximum extension; and wherein the plural teeth of said plurality of at least one tooth of said first toothing are arranged so as to be uniformly circumferentially spaced about the first toothing.

* * * * *